(12) United States Patent
Wang et al.

(10) Patent No.: US 11,498,157 B2
(45) Date of Patent: Nov. 15, 2022

(54) SYSTEM AND METHOD OF ENHANCED AUTOMATED WELDING OF FIRST AND SECOND WORKPIECES

(71) Applicant: GM Global Technology Operations LLC, Detroit, MI (US)

(72) Inventors: Pei-Chung Wang, Troy, MI (US); Spyros P Mellas, Waterford, MI (US); Miguel A Saez, Clarkston, MI (US); John P Spicer, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 355 days.

(21) Appl. No.: 16/778,870

(22) Filed: Jan. 31, 2020

(65) Prior Publication Data

US 2021/0237200 A1    Aug. 5, 2021

(51) Int. Cl.
*B23K 26/08* (2014.01)
*B23K 9/095* (2006.01)
(Continued)

(52) U.S. Cl.
CPC ........ *B23K 26/0884* (2013.01); *B23K 9/0953* (2013.01); *B23K 9/0956* (2013.01); *B23K 9/1274* (2013.01); *B23K 31/125* (2013.01)

(58) Field of Classification Search
CPC .......... B23K 2101/006; B23K 26/0884; B23K 31/125; B23K 9/0953; B23K 9/0956; B23K 9/1274; B23K 9/173
See application file for complete search history.

(56) References Cited

U.S. PATENT DOCUMENTS

| 4,272,665 A  | * | 6/1981 | Steigerwald | B23K 15/02 |
| | | | | 219/121.81 |
| 10,245,630 B2 | * | 4/2019 | Fischer | B21D 22/20 |

(Continued)

FOREIGN PATENT DOCUMENTS

| CN | 103551712 A | 2/2014 |
| CN | 110524581 A | 12/2019 |

(Continued)

OTHER PUBLICATIONS

"Takeda, Welding Robot, 2020" (Year: 2020).*

(Continued)

*Primary Examiner* — Brian W Jennison
*Assistant Examiner* — Abigail H Rhue
(74) *Attorney, Agent, or Firm* — Vivacqua Crane PLLC

(57) ABSTRACT

A system and method of enhanced automated welding of a first workpiece and a second workpiece are provided. The method comprises providing a system for intelligent robot-based welding of the first workpiece and the second workpiece. The method further comprises determining a geometrical location of the first workpiece and the second workpiece to be welded at a welding sequence based a predetermined process variable. The method further comprises adjusting the predetermined process variable based on the geometrical location of the first and second workpieces to define an actual process variable. The method further comprises welding a first portion of the first and second workpieces with the actual process variable to define a first welded portion. The method further comprises determining a weld quality of the first welded portion.

20 Claims, 4 Drawing Sheets

(51) Int. Cl.
  *B23K 31/12* (2006.01)
  *B23K 9/127* (2006.01)

(56) References Cited

U.S. PATENT DOCUMENTS

| 10,695,856 | B2 * | 6/2020 | Durik | B23K 9/0732 |
| 2015/0076119 | A1 * | 3/2015 | Hsu | B23K 9/0216 |
| | | | | 219/74 |
| 2021/0027659 | A1 * | 1/2021 | Becker | G09B 19/24 |

FOREIGN PATENT DOCUMENTS

| CN | 111103291 | A | * | 5/2020 | |
| JP | 2001205438 | A | * | 7/2001 | |
| JP | 5343772 | B2 | * | 11/2013 | |
| JP | 2020082287 | A | * | 6/2020 | |
| WO | WO-2017184205 | A1 | * | 10/2017 | ............ G01B 11/00 |
| WO | WO-2020262050 | A1 | * | 12/2020 | |

OTHER PUBLICATIONS

"Kato, Method and Device for Manufacturing Weld Zone, 2001" (Year: 2001).*
"Hanada, Repair Welding Examination Device and Repair Welding Examination Method, 2020" (Year: 2020).*
Machine translation of JP-5343772: Mao, Laser / Visual Combined Sensor For Welding And Welding Control Method, 2013 (Year: 2013).*
Machine translation of CN-111103291: Fu, Image Identification And Quality Intelligent Evaluation System Based On Product Welding Line Characteristics, 2020 (Year: 2020).*

* cited by examiner

SYSTEM AND METHOD OF ENHANCED AUTOMATED WELDING OF FIRST AND SECOND WORKPIECES

INTRODUCTION

The present disclosure relates to methods and systems for welding workpieces of motor vehicles, and more particularly to methods and systems having a welding apparatus for enhanced automated welding of first and second workpieces.

Automotive sheet metal and structural welding is a fabrication process that joins components by using heat to melt the material of components and allowing them to cool and fuse together. In gas metal arc welding, a sound weld is affected by the location of substrates to be welded along with the gap therebetween. Moreover, part variations, clamping, and transient distortion may result in discrepant weld during gas metal arc welding.

SUMMARY

While existing welding systems and methods achieve their intended purpose, there is a need for a new and improved welding system that addresses these issues.

In one aspect, a method of enhanced automated welding of a first workpiece and a second workpiece is provided. During welding, process variables are adjusted in real-time based on real-time geometrical measurements of workpieces to be welded, consequently resulting in improved welds. Moreover, continuous communication between system apparatus provides real-time monitoring of workpieces, evaluating of real-time data, adjusting of process variables based on real-time data, welding based on process variables and repairing of welds where needed based on quality tolerance to thereby result in enhanced welds.

In this aspect, the method comprises providing a system for intelligent robot-based welding of the first workpiece and the second workpiece. The method further comprises determining a geometrical location of the first workpiece and the second workpiece to be welded at a welding sequence based a predetermined process variable. In this example, the method further comprises adjusting the predetermined process variable based on the geometrical location of the first and second workpieces to define an actual process variable. The method further comprises welding a first portion of the first and second workpieces with the actual process variable to define a first welded portion and then determining a weld quality of the first welded portion.

In another example of this aspect, the method further comprises determining whether a part distortion of the first welded portion is within a distortion tolerance. The method further comprises adjusting one of the welding sequence and the actual process variable based on the part distortion of the first welded portion to define one of an adjusted welding sequence and an adjusted process variable, if the part distortion exceeds the distortion tolerance. Moreover, the method comprises welding a second portion of the first and second workpieces with one of the adjusted welding sequences and the adjusted process variable to define a second welded portion, if the part distortion exceeds the distortion tolerance.

In another example of this aspect, the predetermined process variable comprises at least one of robot path, weld speed, amplitude of weld path, wavelength of weld path, weld waveform and associated transfer method (short circuit, globular, spray or pulse), weld current, weld voltage, weld waveform frequency, weld wire diameter and shielding gas. In yet another example, the actual process variable comprises at least one of robot path, weld speed, amplitude of weld path, wavelength of weld path, weld current, weld voltage, and weld wire diameter. In still another example, the adjusted process variable comprises at least one of robot path, weld speed, amplitude of weld path, wavelength of weld path, weld current, weld voltage, and weld wire diameter.

In yet another example, the step of determining the geometrical location of the first workpiece and the second workpiece comprises determining whether the first and second workpieces are located within a location tolerance and then determining whether the first and second workpieces have a gap within a gap tolerance.

In still another example, the step of adjusting the predetermined process variable comprises adjusting the predetermined process variable if the first and second workpieces exceed the location tolerance and then adjusting the predetermined process variable if the gap exceeds the gap tolerance.

In yet another example of this aspect, the system for intelligent robot-based welding of the first workpiece and the second workpiece comprises a robot having a weld gun for welding the first and second workpieces based on a predetermined process variable and a controller in communication the robot and the weld gun. The system further comprises a vision sensor disposed on and in communication with the robot and the controller for sensing geometric location of the first and second workpieces and communicating the geometric location to the controller. The system further comprises a laser projector disposed on and in communication with the robot to project a laser on the first and second workpieces for sensing a gap between the first and second workpieces and communicating the gap to the controller. In this example, the controller is programmed to adjust the predetermined process variable based on the geometric location and the gap of the first and second workpieces, defining the actual process variable. Moreover, the controller is programmed to control the weld gun to weld the first and second workpieces based on the actual process variable. Additionally, the controller is programmed to adjust the actual process variable based on the geometric location and the gap of the first and second workpieces, defining the adjusted process variable. Furthermore, the controller is programmed to control the weld gun to weld the first and second workpieces based on the adjusted process variable.

In this example, the step of determining weld quality comprises determining whether the weld quality of the first welded portion is within a quality tolerance, the quality tolerance being based on degrees of discrepancy. Furthermore, the step of determining weld quality comprises repairing the first welded portion if the weld quality exceeds the quality tolerance.

In another aspect of the present disclosure, a system for intelligent robot-based welding of a first workpiece and a second workpiece is provided. The system comprises a robot having a weld gun for welding the first and second workpieces based on a predetermined process variable and a controller in communication the robot and the weld gun. The system further comprises a vision sensor disposed on and in communication with the robot and the controller for sensing geometric location of the first and second workpieces and communicating the geometric location to the controller. In this aspect, the system further comprises a laser projector disposed on and in communication with the robot to project a laser on the first and second workpieces for sensing a gap between the first and second workpieces and communicating the gap to the controller.

In this example, the controller is programmed to adjust the predetermined process variable based on the geometric location and the gap of the first and second workpieces, defining an adjusted process variable. Moreover, the controller is programmed to control the weld gun to weld the first and second workpieces based on the adjusted process variable. Additionally, the controller is programmed to adjust the actual process variable based on the geometric location and the gap of the first and second workpieces, defining the adjusted process variable. Furthermore, the controller is programmed to control the weld gun to weld the first and second workpieces based on the adjusted process variable.

In yet another aspect, a method of enhanced automated welding of a first workpiece and a second workpiece is provided. The method comprises providing a system for intelligent robot-based welding of the first workpiece and the second workpiece. In this example, the system comprises a robot having a weld gun for welding the first and second workpieces based on a predetermined process variable and a controller in communication the robot and the weld gun. The system further comprises a vision sensor disposed on and in communication with the robot and the controller for sensing geometric location of the first and second workpieces and communicating the geometric location to the controller. The system further comprises a laser projector disposed on and in communication with the robot to project a laser on the first and second workpieces for sensing a gap between the first and second workpieces and communicating the gap to the controller.

In this aspect, the method further comprises determining a geometrical location of the first workpiece and the second workpiece to be welded at a welding sequence based a predetermined process variable. The method further comprises adjusting the predetermined process variable based on the geometrical location of the first and second workpieces to define an actual process variable. The method further comprises welding a first portion of the first and second workpieces with the actual process variable to define a first welded portion.

After welding, the method further comprises determining whether a part distortion of the first welded portion is within a distortion tolerance. In this example, the method further comprises adjusting one of the welding sequence and the actual process variable based on the part distortion of the first welded portion to define one of an adjusted welding sequence and an adjusted process variable, if the part distortion exceeds the distortion tolerance. Then, the method comprises welding a second portion of the first and second workpieces with one of the adjusted welding sequences and the adjusted process variable to define a second welded portion, if the part distortion exceeds the distortion tolerance. Furthermore, the method comprises determining a weld quality of the first welded portion.

In this aspect, the predetermined process variable comprises at least one of robot path, weld speed, amplitude of weld path, wavelength of weld path, weld current, weld voltage, and weld wire diameter. In another example of this aspect, the actual process variable comprises at least one of robot path, weld speed, amplitude of weld path, wavelength of weld path, weld current, weld voltage, and weld wire diameter. Furthermore, the adjusted process variable comprises at least one of robot path, weld speed, amplitude of weld path, wavelength of weld path, weld current, weld voltage, and weld wire diameter.

In another example of this aspect, the step of determining the geometrical location of the first workpiece and the second workpiece comprises determining whether the first and second workpieces are located within a location tolerance and then determining whether the first and second workpieces have a gap within a gap tolerance.

In yet another example, the step of adjusting the predetermined process variable comprises adjusting the predetermined process variable if the first and second workpieces exceed the location tolerance, and adjusting the predetermined process variable if the gap exceeds the gap tolerance.

In still another example of this aspect, the step of determining weld quality comprises determining whether the weld quality of the first welded portion is within a quality tolerance, the quality tolerance being based on degrees of discrepancy. Furthermore, the step of determining weld quality comprises repairing the first welded portion if the weld quality exceeds the quality tolerance.

In yet another example of this aspect, the controller is programmed to adjust the predetermined process variable based on the geometric location and the gap of the first and second workpieces, defining the actual process variable. Moreover, the controller is programmed to control the weld gun to weld the first and second workpieces based on the actual process variable. Additionally, the controller is programmed to adjust the actual process variable based on the geometric location and the gap of the first and second workpieces, defining the adjusted process variable. Furthermore, the controller is programmed to control the weld gun to weld the first and second workpieces based on the adjusted process variable.

In still another example of this aspect, the method further comprises determining whether the first welded portion and second weld portion equals a number of targeted welds. Moreover, the method comprises completing the welding of the first workpiece and the second workpiece if the first and second welded portions equal the number of targeted welds.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
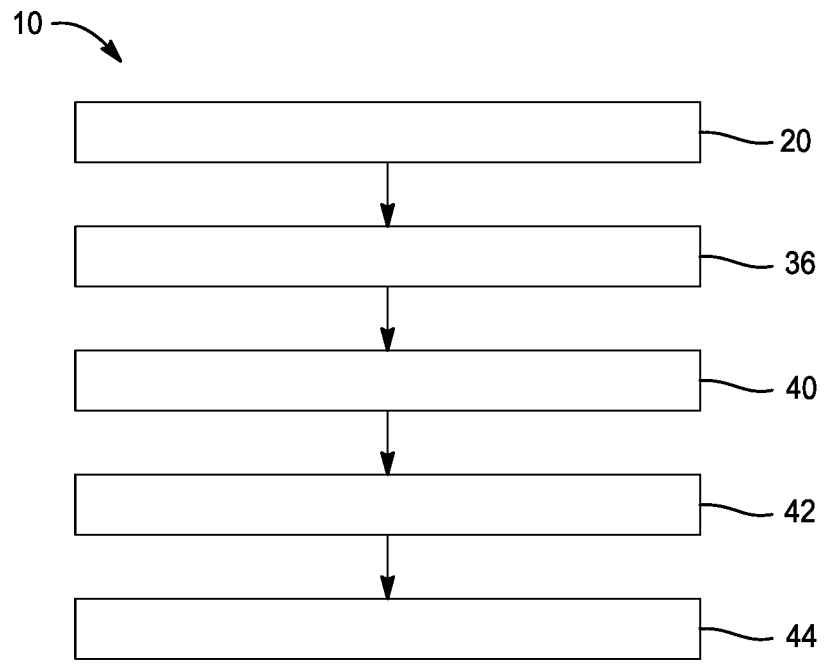
FIG. 1 is a flowchart of a method for enhanced automated welding in accordance with one example of the present disclosure.
Figure 2:
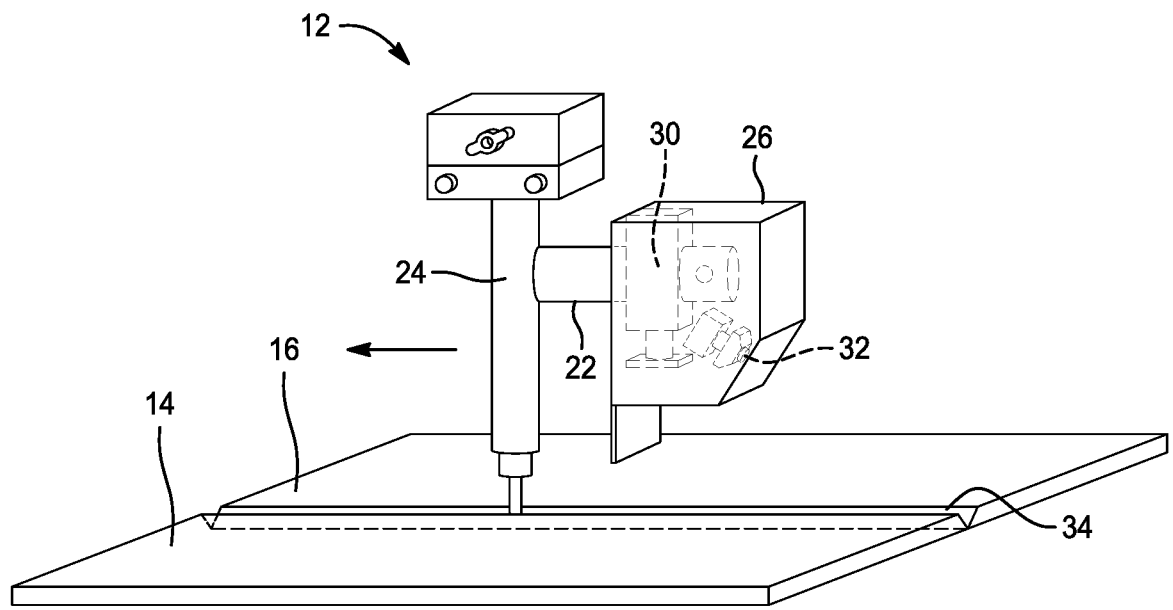
FIG. 2 is schematic view of a system for intelligent robot-based welding applicable to the method in FIG. 1.

In accordance with one example of the present disclosure, FIGS. 1 and 2 illustrate a method 10 and system 12 for enhanced automated welding of a first workpiece 14 and a second workpiece 16. As shown in FIG. 1, the method 10 of enhanced automated welding of a first workpiece 14 and a second workpiece 16 is provided. The method 10 may be carried out by any suitable welding system and apparatus, for example an arc welding system. During welding, process variables are adjusted in real-time based on real-time geometrical measurements of workpieces to be welded, consequently resulting in improved welds. Moreover, continuous communication between system apparatus provides real-time monitoring of workpieces, evaluating of real-time data, adjusting of process variables based on real-time data, welding based on process variables and repairing of welds where needed based on quality tolerance to thereby result in enhanced welds.

In this example, the method 10 of FIG. 1 comprises providing a system 12 (shown in FIG. 2) for intelligent robot-based welding of the first workpiece 14 and the second workpiece 16 in box 20. As depicted in FIG. 2, the system 12 comprises a robot 22 having a weld gun 24 for welding the first and second workpieces 14, 16 based on a predetermined process variable. The weld gun 24 may be an arc weld gun or any other suitable weld gun without departing from the spirit or scope of the present disclosure. Moreover, in this example, the predetermined process variable comprises at least one of robot path, weld speed, amplitude of weld path, wavelength of weld path, weld current, weld voltage, and weld wire diameter. It is to be understood that the predetermined process variable may include any other suitable variable without departing from the spirit or scope of the present disclosure.

Referring to FIG. 2, the system 12 further comprises a controller 26 in communication with the robot 22 and the weld gun 24. The controller 26 may be in communication with the robot 22 and weld gun 24 by way of wires. Alternatively, the controller 26 may be in communication with the robot 22 and the weld gun 24 by way of a wireless system or any other suitable manner without departing from the spirit or scope of the present disclosure.

In this example, the system 12 further comprises a vision sensor 30 disposed on the robot 22 and in communication with the controller 26. Moreover, the vision sensor 30 is in communication with the controller 26 for sensing geometric location of the first and second workpieces 14, 16 and for communicating geometric location data of the first and second substrates to the controller 26. The vision sensor 30 may be in communication with the controller 26 by way of wire or a wireless system without departing from the spirit or scope of the present disclosure.

In this example, the system 12 further comprises a laser projector 32 disposed on the robot 22 and in communication with the controller 26 to project a laser on the first and second workpieces 14, 16 for sensing a gap 34 between the first and second workpieces 14, 16. Moreover, the laser projector 32 is in communication with the controller 26 for communicating dimensions or gap data of the gap 34 to the controller 26.

Preferably, the controller 26 is programmed to adjust the predetermined process variable based on the geometric data and the gap data of the first and second workpieces 14, 16, defining an actual process variable. In this embodiment, the vision sensor 30 senses the geometric location of the first and second substrates and transmits geometric data thereof to the controller 26. Moreover, the laser projector 32 senses a gap 34 between the first and second workpieces 14, 16 and transmits gap data to the controller 26. Preferably, the controller 26 is programmed to control the weld gun 24 and robot 22 to weld the first and second workpieces 14, 16 based on the actual process variable.

As described in greater detail below, the controller 26 is programmed to adjust the actual process variable based on the geometric location and the gap 34 of the first and second workpieces 14, 16, defining an adjusted process variable. Furthermore, the controller 26 is programmed to control the weld gun 24 and robot 22 to weld the first and second workpieces 14, 16 based on the adjusted process variable.

Referring to FIG. 1, the method 10 further comprises determining a geometric location of the first workpiece 14 and the second workpiece 16 to be welded at a welding sequence based on the predetermined process variable in box 36. As discussed above, the transient geometric location of the first and second workpieces 14, 16 are sensed by the vision sensor 30 which transmits geometric data to the controller 26 in real-time.

In this example, the method 10 further comprises adjusting in real-time the predetermined process variable via the controller 26 based on the transient geometric location of the first and second workpieces 14, 16 to define the actual process variable in box 40. In this example, the actual process variable comprises at least one of robot path, weld speed, amplitude of weld path, wavelength of weld path, weld current, weld voltage, and weld wire diameter. It is to be understood that the actual process variable may include any other suitable variable without departing from the spirit or scope of the present disclosure.

As shown, the method 10 further comprises welding a first portion of the first and second workpieces 14, 16 with the actual process variable to define a first welded portion in box 42. As mentioned above, the welding is performed by the weld gun 24 which is controlled by the controller 26 having an algorithm in accordance with welding the first portion.

In this example, the method 10 further comprises determining a weld quality of the first welded portion in box 44. The step of determining weld quality may be accomplished by way of the vision sensor 30 or the laser sensor or both in communication with the controller 26 having an algorithm in accordance with determining weld quality.

Figure 3:
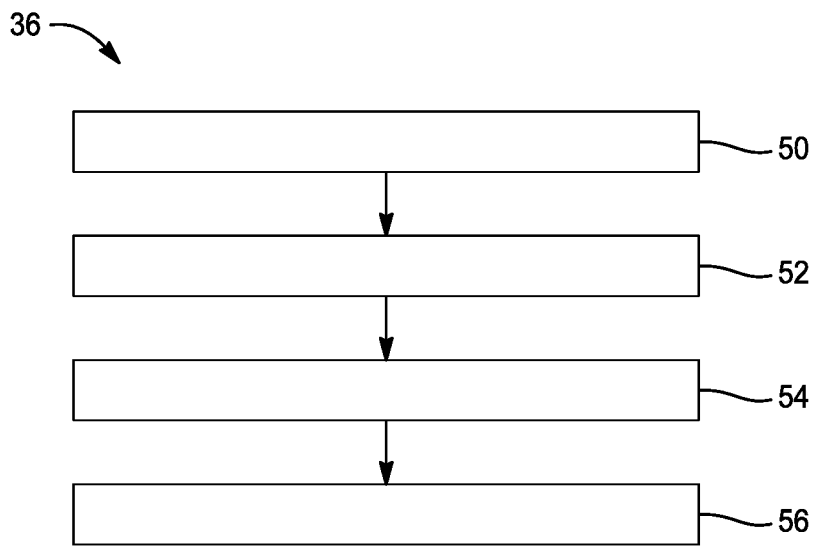
FIG. 3 is a flowchart depicting steps of the method in FIG. 1 in accordance with another example of the present disclosure.

In one example as shown in FIG. 3, the step 36 of determining the geometrical location comprises a step of determining whether the first and second workpieces 14, 16 are located within a location tolerance programmed within the controller 26 in box 50. The geometric location of the first and second workpieces 14, 16 is sensed by the vision sensor 30 which transmits geometric data thereof to the controller 26 in real-time. Moreover, the step of determining the geometrical location may comprise a step of determining whether the first and second workpieces 14, 16 have a gap 34 within a gap tolerance programmed within the controller 26 in box 52. The gap 34 is sensed by the laser projector 32 which transmits gap data thereof to the controller 26 real-time.

Additionally, as shown in FIG. 3, the step 40 of adjusting the predetermined process variable comprises adjusting via the controller 26 the predetermined process variable if the first and second workpieces 14, 16 exceed the location tolerance in box 54. Furthermore, the step of adjusting the predetermined process variable may further comprise adjusting via the controller 26 the predetermined process variable if the gap 34 exceeds the gap tolerance in box 56. In this example, the controller 26 comprises at least one algorithm for adjusting the predetermined process variable.

Figure 4:
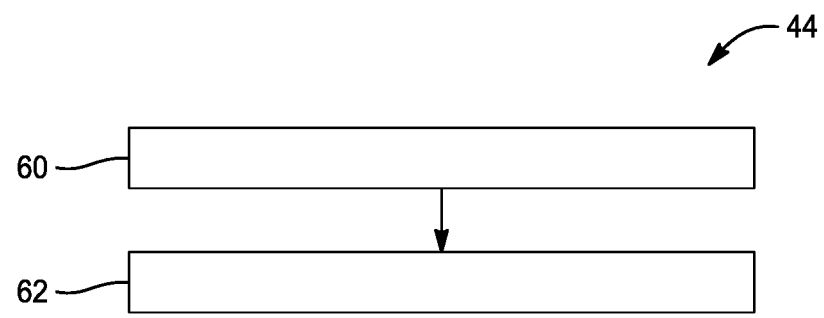
FIG. 4 is a flowchart of steps of the method in FIG. 1 in accordance with yet another example of the present disclosure.

In this example as shown in FIG. 4, the step 44 of determining weld quality comprises determining whether the weld quality of the first welded portion is within a quality tolerance programmed in the controller 26 in box 60. The step of determining weld quality may be carried out by the vision sensor 30 or the laser projector 32, or both, in communication with the controller 26. The quality tolerance may be based on degrees of discrepancy in quality tolerance by any suitable manner. For example, a quality tolerance may include but is not limited to the following: a visual evaluation or discrepancy, a visual measurement, and a weld cross-section evaluation.

Examples of a visual evaluation of the weld may include but is not limited to the following: an off-location weld, a missing weld, an extra weld, a burn-through weld, a melt through weld, a roll-over weld, a longitudinal surface crack, a meltback, a weld direction, a crater, skips, notching, extra starts and stops not shown on product specifications. Examples of a visual measurement may include but is not limited to the following: undercut, effective weld length, surface porosity per unit length, transverse surface cracks for brazed joints on a per unit requirement, and off-location as dictated by product specifications. Examples of a weld cross-section evaluation may include but is not limited to the following: leg length, throat length, depth of penetration, evidence of adhesion, evidence of fusion or adhesion at the joint root, internal porosity, internal cracks, arc spot weld size and weld/braze size for arc plug welds/brazes.

As shown in FIG. 4, the step 44 of determining weld quality comprises repairing the first welded portion if the weld quality exceeds the quality tolerance in box 62. The step of repairing may be accomplished by way of the weld gun 24 and robot 22 in communication with the controller 26.

In one example, prior to the step of determining a weld quality of the first welded portion, the method 10 may further comprise determining whether a part distortion of the first welded portion is within a distortion tolerance programmed in the controller 26. The step of determining the part distortion may be accomplished by vision sensor 30 and the laser sensor or both in communication with the controller 26. If the part distortion exceeds the distortion tolerance, the method 10 further comprises adjusting either the welding sequence or the actual process variable based on the part distortion of the first welded portion, or both. The step of adjusting welding sequence defines an adjusted welding sequence, and the step of adjusting the actual process variable based on the part distortion of the first welded portion defines an adjusted process variable. In this example, the adjusted process variable comprises at least one of robot path, weld speed, amplitude of weld path, wavelength of weld path, weld current, weld voltage, and weld wire diameter.

Moreover, the method 10 comprises welding a second portion of the first and second workpieces 14, 16 with one of the adjusted welding sequences and the adjusted process variable to define a second welded portion, if the part distortion exceeds the distortion tolerance.

Figure 5:
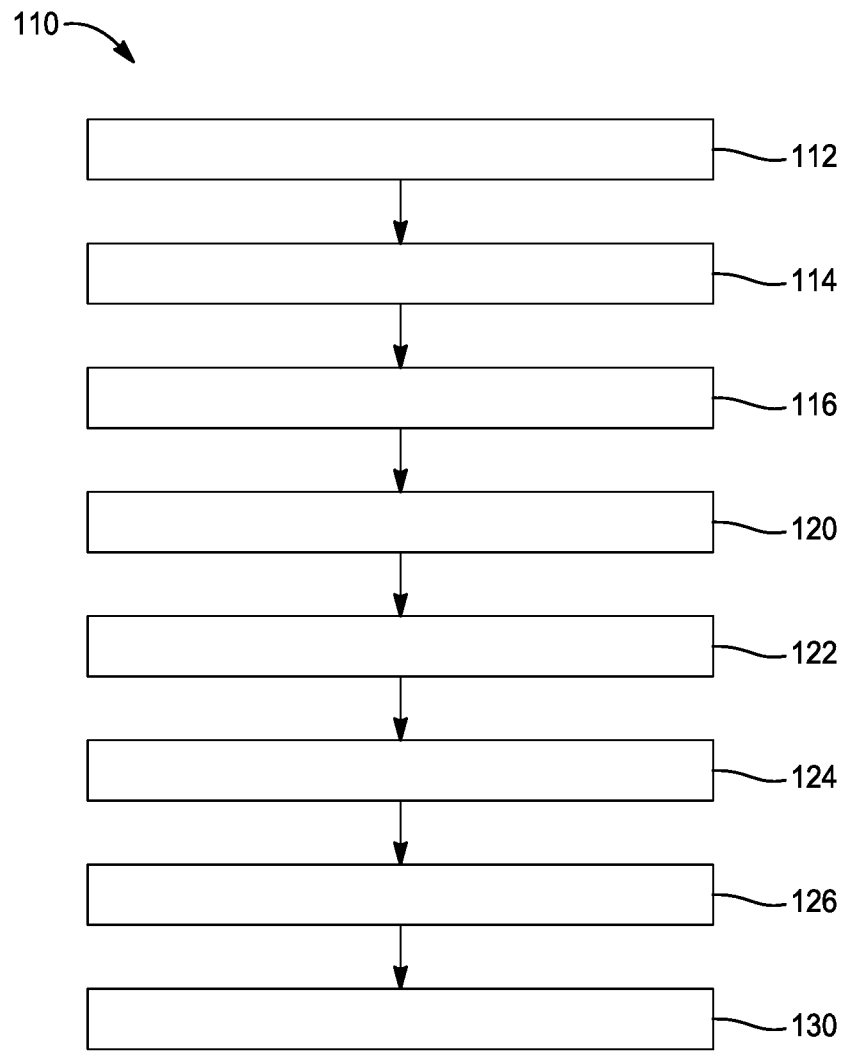
FIG. 5 is a flowchart of a method of enhanced automated welding in accordance with another example of the present disclosure.

In accordance with another aspect of the present disclosure, FIG. 5 depicts a method 110 of enhanced automated welding of a first workpiece 14 and a second workpiece 16. As shown, the method 110 comprises providing a system 12 (see FIG. 2 for example) for intelligent robot-based welding of the first workpiece 14 and the second workpiece 16 in box 112. The system 12 illustrated in FIG. 2 is one example of such system that may carry out the steps depicted in FIG. 5. However, it is understood that other suitable systems and apparatus may be used to carry out the steps of the method 110 without departing from the spirit or scope of the present disclosure.

In this aspect, the method 110 further comprises determining with the vision sensor 30 a geometrical location of the first workpiece 14 and the second workpiece 16 to be welded at a welding sequence based a predetermined process variable in box 114. Preferably, the vision sensor 30 senses the geometrical location of the first and second workpieces 14, 16 and transmits such data in real-time to the controller 26. In this aspect, the predetermined process variable comprises at least one of robot path, weld speed, amplitude of weld path, wavelength of weld path, weld current, weld voltage, and weld wire diameter programmed in the controller 26.

As shown in FIG. 5, the method 110 further comprises adjusting the predetermined process variable based on the geometrical location of the first and second workpieces 14, 16 to define an actual process variable in box 116. In this example, the actual process variable comprises at least one of robot path, weld speed, amplitude of weld path, wavelength of weld path, weld current, weld voltage, and weld wire diameter programmed in the controller 26.

As shown, the method 110 further comprises welding, by way of the weld gun 24 controlled by the controller 26, a first portion of the first and second workpieces 14, 16 with the actual process variable to define a first welded portion in box 120. Moreover, the controller 26 is programmed to control the weld gun 24 to weld the first and second workpieces 14, 16 based on the actual process variable.

After welding, the method 110 further comprises determining whether a part distortion of the first welded portion is within a distortion tolerance in box 122.

In this example, the method 110 further comprises adjusting one of the welding sequence and the actual process variable based on the part distortion of the first welded portion to define one of an adjusted welding sequence and an adjusted process variable, if the part distortion exceeds the distortion tolerance in box 124. Moreover, the adjusted process variable comprises at least one of robot path, weld speed, amplitude of weld path, wavelength of weld path, weld current, weld voltage, and weld wire diameter programmed in the controller 26. As mentioned above, the controller 26 is programmed to adjust the actual process variable based on the geometric location and the gap 34 of the first and second workpieces 14, 16, defining the adjusted process variable.

As shown in FIG. 5, the method 110 comprises welding a second portion of the first and second workpieces 14, 16 with one of the adjusted welding sequences and the adjusted process variable to define a second welded portion in box 126, if the part distortion exceeds the distortion tolerance. Furthermore, the controller 26 is programmed to control the weld gun 24 to weld the first and second workpieces 14, 16. In this example, the method 110 further comprises determining a weld quality of the first welded portion in box 130.

The step of determining weld quality may be accomplished by way of the vision sensor 30 or the laser sensor or both in communication with the controller 26 having an algorithm in accordance with determining weld quality.

Figure 6:
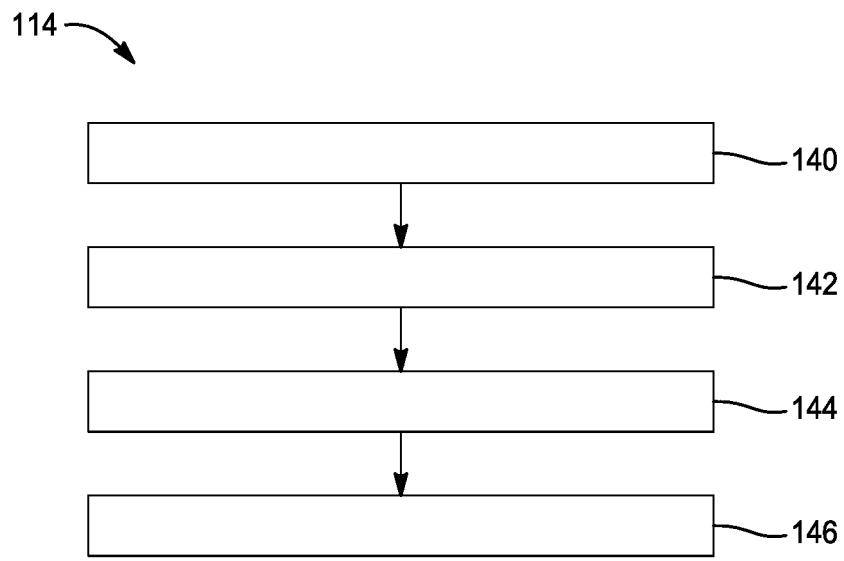
FIG. 6 is a flowchart depicting steps of the method in FIG. 5 in accordance with yet another example of the present disclosure.

FIG. 6 depicts the steps of determining the geometrical location 114 and adjusting the predetermined process variable 116. As shown, the step of determining the geometrical location of the first workpiece 14 and the second workpiece 16 comprises, by way of the controller 26, determining whether the first and second workpieces 14, 16 are located within a location tolerance programmed in the controller 26 in box 140. By way of the controller 26, the step of determining the geometrical location 114 may also comprise determining whether the first and second workpieces 14, 16 have a gap 34 within a gap tolerance programmed in the controller 26 in box 142. Preferably, if the first and second workpieces 14, 16 exceed the location tolerance, the controller 26 adjusts the predetermined process variable in box 144. Moreover, the controller 26 adjusts the predetermined process variable if the gap 34 exceeds the gap tolerance in box 146. As mentioned above, the controller 26 is programmed, e.g., by an algorithm or any suitable manner, to adjust the predetermined process variable based on the geometric location and the gap 34 of the first and second workpieces 14, 16, defining the actual process variable.

Figure 7:
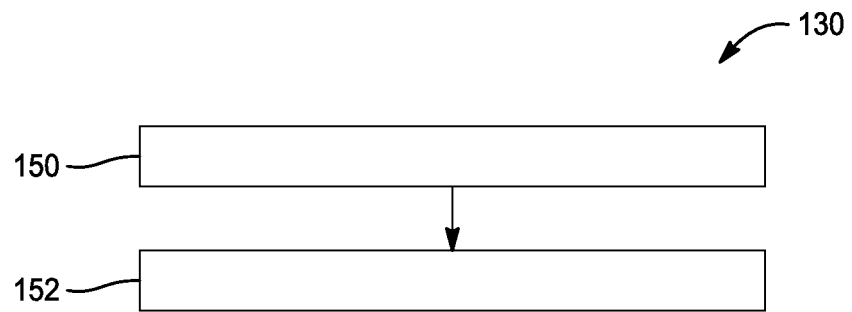
FIG. 7 is a flowchart depicting steps of the method in FIG. 5 in accordance with still another example of the present disclosure.

In this example as shown in FIG. 7, the step 130 of determining weld quality comprises determining whether the weld quality of the first welded portion is within a quality tolerance programmed in the controller 26 in box 150. The step of determining weld quality may be carried out by the vision sensor 30 or the laser projector 32, or both, in communication with the controller 26. The quality tolerance may be based on degrees of discrepancy in quality tolerance by any suitable manner known in the art. For example, a quality tolerance may include but is not limited to the following: a visual evaluation or discrepancy, a visual measurement, and a weld cross-section evaluation.

Examples of visual evaluation of the weld may include but is not limited to the following: an off-location weld, a missing weld, an extra weld, a burn-through weld, a melt through weld, a roll-over weld, a longitudinal surface crack, a meltback, a weld direction, a crater, skips, notching, extra starts and stops not shown on product specifications. Examples of a visual measurement may include but is not limited to the following: undercut, effective weld length, surface porosity per unit length, transverse surface cracks for brazed joints on a per unit requirement, and off-location as dictated by product specifications. Examples of weld cross-section evaluation may include but is not limited to the following: leg length, throat length, depth of penetration, evidence of adhesion, evidence of fusion or adhesion at the joint root, internal porosity, internal cracks, arc spot weld size and weld/braze size for arc plug welds/brazes.

Furthermore, the step of determining weld quality comprises repairing the first welded portion if the weld quality exceeds the quality tolerance in box 152. The step of repairing may be accomplished by way of the weld gun 24 and robot 22 in communication with the controller 26.

In one example, the method 110 further comprises a step of determining whether the first welded portion and second weld portion equals a number of targeted welds. Moreover, the method 110 may comprise a step of completing the welding of the first workpiece 14 and the second workpiece 16 if the first and second welded portions equal the number of targeted welds.

It is to be understood that, in operation, the weld gun may move in various predetermined directions along the length of the weld. For example, the weld may move in a circular motion along the length of the weld. In this example, the size of the radial motion of the weld gun may be directly related to the size of the gap. That is, a larger radius of circular motion may be used for larger gaps and a smaller radius of circular motion may be used for smaller gaps.

For larger gaps, one weld example may involve applying a pulsating welding process, e.g., pulsed arc welding, which enables deposition of a greater amount of weld material to help close gaps.

For situations where the gap width varies within a single welding segment, the welding path and parameters may be varied along a weld segment in order to deposit more or less material as needed. In other words, the welding parameters may or may not be held constant throughout a single weld segment without departing from the spirit or scope of the present invention. For example, where a gap is 1 mm at the start of a segment and 2 mm at the end of the segment, one approach may be to initially use a sinusoidal weld path having an amplitude of +/−0.5 mm and subsequently increase the amplitude linearly until the amplitude is +/−1 mm at the end of the weld segment.

It is to be understood that various welding methods may be used for different gap widths without departing from the spirit or scope of the present invention. For example, a standard continuous straight weld path may be used for gaps less than 1.0 mm, pulsed arc welding may be used for gaps between 1 mm and 2 mm, and a sinusoidal or circular motion weld may be used for gaps greater than 2 mm.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of enhanced automated welding of a first workpiece and a second workpiece, the method comprising:
providing a system for intelligent robot-based welding of the first workpiece and the second workpiece;
determining a transient geometrical location of the first workpiece and the second workpiece to be welded at a welding sequence based a predetermined process variable, wherein determining the transient geometrical location of the first workpiece and the second workpiece includes sensing real-time geometrical measurements of the first workpiece and the second workpiece, and the transient geometrical location of the first workpiece and the second workpiece are based on the real-time geometrical measurements;
adjusting in real-time the predetermined process variable based on the transient geometrical location of the first and second workpieces to define an actual process variable, wherein the predetermined process variable is adjusted in real-time based on the real-time geometrical measurements;
welding a first portion of the first and second workpieces with the actual process variable to define a first welded portion; and
determining a weld quality of the first welded portion.

2. The method of claim 1 further comprising:
determining whether a part distortion of the first welded portion is within a distortion tolerance;
adjusting one of the welding sequence and the actual process variable based on the part distortion of the first welded portion to define one of an adjusted welding sequence and an adjusted process variable, if the part distortion exceeds the distortion tolerance; and welding a second portion of the first and second workpieces with one of the adjusted welding sequences and the adjusted process variable to define a second welded portion, if the part distortion exceeds the distortion tolerance.

3. The method of claim 1 wherein the predetermined process variable comprises at least one of robot path, weld speed, amplitude of weld path, wavelength of weld path, weld current, weld voltage, and weld wire diameter.

4. The method of claim 1 wherein the actual process variable comprises at least one of robot path, weld speed, amplitude of weld path, wavelength of weld path, weld current, weld voltage, and weld wire diameter.

5. The method of claim 2 wherein the adjusted process variable comprises at least one of robot path, weld speed, amplitude of weld path, wavelength of weld path, weld current, weld voltage, and weld wire diameter.

6. The method of claim 1 wherein the step of determining the geometrical location of the first workpiece and the second workpiece comprises:
   determining whether the first and second workpieces are located within a location tolerance; and
   determining whether the first and second workpieces have a gap within a gap tolerance.

7. The method of claim 6 wherein the step of adjusting the predetermined process variable comprises:
   adjusting the predetermined process variable if the first and second workpieces exceed the location tolerance; and
   adjusting the predetermined process variable if the gap exceeds the gap tolerance
   wherein a gap width of the gap varies within a single welding segment;
   wherein the gap width is one millimeter at a start of the single welding segment;
   wherein the gap width is two millimeters at an end of the single welding segment;
   wherein the actual process variable is a weld path;
   wherein the weld path has a sinusoidal shape;
   wherein the sinusoidal shape has an amplitude that starts at +/−0.5 millimeters and linearly increases until the amplitude is +/−1 millimeters at the end of the single weld segment.

8. The method of claim 1 wherein the system for intelligent robot-based welding of the first workpiece and the second workpiece comprises:
   a robot having a weld gun for welding the first and second workpieces based on a predetermined process variable;
   a controller in communication the robot and the weld gun;
   a vision sensor disposed on and in communication with the robot and the controller for sensing geometric location of the first and second workpieces and communicating the geometric location to the controller;
   a laser projector disposed on and in communication with the robot to project a laser on the first and second workpieces for sensing a gap between the first and second workpieces and communicating the gap to the controller, wherein the laser projector is separate from the vision sensor, the laser projector is spaced apart from the laser projector;
   wherein the controller is programmed to adjust the predetermined process variable based on the geometric location and the gap of the first and second workpieces, defining the actual process variable,
   wherein the controller is programmed to control the weld gun to weld the first and second workpieces based on the actual process variable,
   wherein the controller is programmed to adjust the actual process variable based on the geometric location and the gap of the first and second workpieces, defining the adjusted process variable,
   wherein the controller is programmed to control the weld gun to weld the first and second workpieces based on the adjusted process variable;
   wherein the real-time geometric measurements are part of geometric data; and
   wherein the method further comprising transmitting the geometric data to the controller in real-time.

9. The method of claim 1 wherein the step of determining weld quality comprises:
   determining whether the weld quality of the first welded portion is within a quality tolerance, the quality tolerance being based on degrees of discrepancy; and
   repairing the first welded portion if the weld quality exceeds the quality tolerance.

10. A system for intelligent robot-based welding of a first workpiece and a second workpiece, the system comprising:
   a robot having a weld gun for welding the first and second workpieces based on a predetermined process variable;
   a controller in communication the robot and the weld gun;
   a vision sensor disposed on and in communication with the robot and the controller, wherein the vision sensor is configured to sense real-time geometrical measurements of the first workpiece and the second workpiece to determine a transient geometric location of the first workpiece and the second workpiece, the real-time geometrical measurements of the first workpiece and the second workpiece are part of geometric data, and the vision sensor is configured to transmit the geometric data to the controller in real-time;
   a laser projector disposed on and in communication with the robot to project a laser on the first and second workpieces for sensing a gap between the first and second workpieces and communicating the gap to the controller;
   wherein the controller is programmed to adjust the predetermined process variable in real-time based on the geometric location and the gap of the first and second workpieces, defining an adjusted process variable, wherein the predetermined process variable is adjusted in real-time based on the real-time geometrical measurements;
   wherein the controller is programmed to control the weld gun to weld the first and second workpieces based on the adjusted process variable.

11. The system of claim 10 wherein the controller is programmed to adjust the actual process variable based on the geometric location and the gap of the first and second workpieces, defining the adjusted process variable, and wherein the controller is programmed to control the weld gun to weld the first and second workpieces based on the adjusted process variable, the laser projector and the vision sensor are separate components, the laser projector and the vision sensor are spaced apart from each other.

12. A method of enhanced automated welding of a first workpiece and a second workpiece, the method comprising:
   providing a system for intelligent robot-based welding of the first workpiece and the second workpiece, the system comprising:

a robot having a weld gun for welding the first and second workpieces based on a predetermined process variable;
a controller in communication the robot and the weld gun;
a vision sensor disposed on and in communication with the robot and the controller for sensing geometric location of the first and second workpieces and communicating the geometric location to the controller;
a laser projector disposed on and in communication with the robot to project a laser on the first and second workpieces for sensing a gap between the first and second workpieces and communicating the gap to the controller;
determining a transient geometrical location of the first workpiece and the second workpiece to be welded at a welding sequence based a predetermined process variable, wherein determining the transient geometrical location of the first workpiece and the second workpiece includes sensing real-time geometrical measurements of the first workpiece and the second workpiece;
adjusting in real-time the predetermined process variable based on the geometrical location of the first and second workpieces to define an actual process variable, wherein the predetermined process variable is adjusted in real-time based on the real-time geometrical measurements;
welding a first portion of the first and second workpieces with the actual process variable to define a first welded portion;
determining whether a part distortion of the first welded portion is within a distortion tolerance;
adjusting one of the welding sequence and the actual process variable based on the part distortion of the first welded portion to define one of an adjusted welding sequence and an adjusted process variable, if the part distortion exceeds the distortion tolerance;
welding a second portion of the first and second workpieces with one of the adjusted welding sequences and the adjusted process variable to define a second welded portion, if the part distortion exceeds the distortion tolerance; and
determining a weld quality of the first welded portion.

13. The method of claim 12 wherein the predetermined process variable is a first predetermined process variable of a plurality of predetermined process variables, the plurality of predetermined process variables includes robot path, weld speed, amplitude of weld path, wavelength of weld path, weld current, weld voltage, and weld wire diameter, the laser projector and the vision sensor are separate components, the laser projector and the vision sensor are spaced apart from each other, the actual process variable is a first actual process variable of a plurality of actual process variables, adjusting in real-time the predetermined process variable based on the geometrical location of the first welded portion includes adjusting each of the plurality of predetermined process variables based on the geometrical location of the first and second workpieces to define the plurality of actual process variables.

14. The method of claim 13 wherein the plurality of actual process variables includes a robot path, a weld speed, an amplitude of weld path, a wavelength of weld path, a weld current, a weld voltage, and a weld wire diameter.

15. The method of claim 12 wherein the step of determining weld quality comprises:
determining whether the weld quality of the first welded portion is within a quality tolerance;
repairing the first welded portion if the weld quality exceeds the quality tolerance
wherein determining weld quality is carried out by both the vision sensor and the laser projector, the quality tolerance includes a visual evaluation, a visual measurement, and a weld cross-section evaluation, the visual evaluation includes off-location weld, a missing weld, an extra weld, a burn-through weld, a melt through weld, a roll-over weld, a longitudinal surface crack, a meltback, a weld direction, a crater, skips, notching, and extra starts and stops not shown on product specifications, the visual measurements includes an undercut, an effective weld length, a surface porosity per unit length, a transverse surface cracks for brazed joints on a per unit requirement, and an off-location as dictated by the product specifications, the weld cross-section evaluation includes a leg length, a throat length, a depth of penetration, an evidence of adhesion, an evidence of fusion or adhesion at a joint root, an internal porosity, internal cracks, an arc spot weld size, and a weld size for arc plug welds.

16. The method of claim 13 wherein the step of determining the geometrical location of the first workpiece and the second workpiece comprises:
determining whether the first and second workpieces are located within a location tolerance; and
determining whether the first and second workpieces have a gap within a gap tolerance.

17. The method of claim 16 wherein the step of adjusting the predetermined process variable comprises:
adjusting the predetermined process variable if the first and second workpieces exceed the location tolerance; and
adjusting the predetermined process variable if the gap exceeds the gap tolerance.

18. The method of claim 12 wherein the step of determining weld quality comprises:
determining whether the weld quality of the first welded portion is within a quality tolerance, the quality tolerance being based on degrees of discrepancy;
repairing the first welded portion if the weld quality exceeds the quality tolerance.

19. The method of claim 12 wherein the controller is programmed to adjust the predetermined process variable based on the geometric location and the gap of the first and second workpieces, defining the actual process variable,
wherein the controller is programmed to control the weld gun to weld the first and second workpieces based on the actual process variable,
wherein the controller is programmed to adjust the actual process variable based on the geometric location and the gap of the first and second workpieces, defining the adjusted process variable, and
wherein the controller is programmed to control the weld gun to weld the first and second workpieces based on the adjusted process variable.

20. The method of claim 12 further comprising:
determining whether the first welded portion and second weld portion equals a number of targeted welds; and
completing the welding of the first workpiece and the second workpiece if the first and second welded portions equal the number of targeted welds.

* * * * *